US011466582B2

United States Patent
Day et al.

(10) Patent No.: US 11,466,582 B2
(45) Date of Patent: *Oct. 11, 2022

(54) TURBINE ENGINE INDUCER ASSEMBLY

(71) Applicant: General Electric Company, Schenectady, NY (US)

(72) Inventors: Christophe Jude Day, Hamilton, OH (US); Kenneth Edward Seitzer, Cincinnati, OH (US); Michael Alan Hile, Cincinnati, OH (US); Thomas Alan Wall, West Chester, OH (US); Carol Anne Venn, North Hampton, NH (US); Anthony Paul Greenwood, Kings Mills, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,390

(22) Filed: Sep. 28, 2020

(65) Prior Publication Data

US 2021/0062664 A1 Mar. 4, 2021

Related U.S. Application Data

(63) Continuation of application No. 15/291,106, filed on Oct. 12, 2016, now Pat. No. 10,787,920.

(51) Int. Cl.
*F01D 9/06* (2006.01)
*F02C 7/18* (2006.01)
(Continued)

(52) U.S. Cl.
CPC ............... *F01D 9/06* (2013.01); *F01D 5/082* (2013.01); *F01D 25/32* (2013.01); *F02C 7/18* (2013.01);
(Continued)

(58) Field of Classification Search
CPC .......... F02C 7/12; F02C 7/12518; F02C 9/18; F01D 5/08; F01D 5/081; F01D 5/082;
(Continued)

(56) References Cited

U.S. PATENT DOCUMENTS

| 1,246,344 A | 11/1917 | Steckle |
| 1,756,253 A | 4/1930 | Lykken |

(Continued)

FOREIGN PATENT DOCUMENTS

| CN | 1568397 | 1/2005 |
| CN | 1816683 | 8/2006 |

(Continued)

OTHER PUBLICATIONS

United States Patent and Trademark Office, "Notice of Allowability," issued in connection with U.S. Appl. No. 15/291,106, dated Jun. 16, 2020, 14 pages.

(Continued)

*Primary Examiner* — Alain Chau
(74) *Attorney, Agent, or Firm* — Hanley, Flight & Zimmerman, LLC

(57) ABSTRACT

An apparatus and method for assembling an inducer assembly for inducing a rotation on an airflow passing within a turbine engine. The inducer assembly can provide a volume of fluid from a compressor section to a turbine section of the engine. The inducer assembly can include the combination of separate segments to form an annular inducer.

18 Claims, 12 Drawing Sheets

(51) Int. Cl.
*F01D 25/32* (2006.01)
*F01D 5/08* (2006.01)
*F02C 9/18* (2006.01)

(52) U.S. Cl.
CPC ............ *F02C 9/18* (2013.01); *F05D 2210/40* (2013.01); *F05D 2220/323* (2013.01); *F05D 2230/22* (2013.01); *F05D 2230/30* (2013.01); *F05D 2230/51* (2013.01); *F05D 2230/60* (2013.01); *F05D 2240/12* (2013.01); *F05D 2250/25* (2013.01); *F05D 2260/14* (2013.01); *F05D 2260/20* (2013.01); *F05D 2260/209* (2013.01); *F05D 2260/601* (2013.01); *F05D 2260/607* (2013.01); *Y02T 50/60* (2013.01)

(58) Field of Classification Search
CPC . F01D 5/085; F01D 5/189; F01D 9/00; F01D 9/06; F01D 9/065; F01D 25/12; F01D 25/28; F01D 25/32; F01D 11/24; F05D 2260/14; F05D 2260/20; F05D 2260/209; F05D 2260/607; F05D 2230/51
See application file for complete search history.

(56) References Cited

U.S. PATENT DOCUMENTS

| | | | |
|---|---|---|---|
| 2,806,551 A * | 9/1957 | Heinrich | B04C 3/04 55/340 |
| 2,938,658 A | 5/1960 | Foster | |
| 3,117,027 A | 1/1964 | Lindlof et al. | |
| 3,788,762 A | 1/1974 | Partos | |
| 3,832,090 A | 8/1974 | Matto | |
| 4,178,129 A | 12/1979 | Jenkinson | |
| 4,344,291 A | 8/1982 | Tyree, Jr. et al. | |
| 4,356,707 A | 11/1982 | Tyree, Jr. et al. | |
| 4,466,239 A | 8/1984 | Napoli et al. | |
| 4,807,433 A | 2/1989 | Martin et al. | |
| 4,832,709 A | 5/1989 | Nagyszalanczy | |
| 4,840,645 A | 6/1989 | Woodworth et al. | |
| 4,882,902 A | 11/1989 | Reigel et al. | |
| 4,928,480 A | 5/1990 | Oliver et al. | |
| 5,003,773 A | 4/1991 | Beckwith | |
| 5,039,317 A | 8/1991 | Thompson et al. | |
| 5,240,083 A | 8/1993 | Lyon | |
| 5,245,821 A | 9/1993 | Thomas, Jr. et al. | |
| 5,575,616 A | 11/1996 | Hagle et al. | |
| 5,682,957 A | 11/1997 | Lyon | |
| 5,914,454 A | 6/1999 | Imbaro et al. | |
| 5,941,467 A | 8/1999 | McArdle et al. | |
| 6,007,055 A | 12/1999 | Schiffter | |
| 6,050,079 A | 4/2000 | Durgin et al. | |
| 6,234,746 B1 | 5/2001 | Schroder et al. | |
| 6,431,820 B1 | 8/2002 | Beacock et al. | |
| 6,499,285 B1 | 12/2002 | Snyder | |
| 6,811,757 B2 | 11/2004 | Niv et al. | |
| 6,818,033 B2 | 11/2004 | North | |
| 6,936,095 B2 | 8/2005 | North | |
| 6,962,482 B2 | 11/2005 | Tanaka | |
| 6,969,237 B2 * | 11/2005 | Hudson | F01D 25/32 416/97 R |
| 7,137,777 B2 | 11/2006 | Fried et al. | |
| 7,141,812 B2 | 11/2006 | Appleby et al. | |
| 7,411,204 B2 | 8/2008 | Appleby et al. | |
| 7,429,559 B2 | 9/2008 | Yamamoto et al. | |
| 7,628,924 B2 | 12/2009 | Ladouceur et al. | |
| 7,677,308 B2 | 3/2010 | Kolle | |
| 7,785,098 B1 | 8/2010 | Appleby et al. | |
| 7,823,389 B2 | 11/2010 | Seitzer et al. | |
| 7,893,413 B1 | 2/2011 | Appleby et al. | |
| 7,914,255 B2 | 3/2011 | Workman et al. | |
| 7,967,554 B2 | 6/2011 | Bremer | |
| 3,049,193 A1 | 11/2011 | Appleby et al. | |
| 8,066,473 B1 | 11/2011 | Aho, Jr. | |
| 8,067,030 B2 | 11/2011 | Yamamoto et al. | |
| 8,176,720 B2 | 5/2012 | Beeck | |
| 8,246,987 B2 | 8/2012 | Yamamoto et al. | |
| 8,381,533 B2 | 2/2013 | Smoke et al. | |
| 8,408,446 B1 | 4/2013 | Smoke et al. | |
| 8,460,434 B2 | 6/2013 | Turner et al. | |
| 8,578,720 B2 | 11/2013 | Ebert et al. | |
| 8,584,469 B2 | 11/2013 | Laurello et al. | |
| 8,613,199 B2 | 12/2013 | Kimmel et al. | |
| 8,677,766 B2 | 3/2014 | Laurello et al. | |
| 8,727,703 B2 | 5/2014 | Laurello et al. | |
| 8,807,942 B2 | 8/2014 | Tibbott et al. | |
| 8,815,801 B2 | 8/2014 | Yamamoto et al. | |
| 8,920,128 B2 | 12/2014 | Matwey et al. | |
| 9,003,759 B2 | 4/2015 | Suciu et al. | |
| 9,023,566 B2 | 5/2015 | Martin | |
| 9,029,058 B2 | 5/2015 | Martin | |
| 9,115,586 B2 | 8/2015 | Jan et al. | |
| 9,144,940 B2 | 9/2015 | Martin | |
| 9,188,347 B1 | 11/2015 | Ohunna, II | |
| 9,206,309 B2 | 12/2015 | Appleby et al. | |
| 9,217,566 B2 | 12/2015 | Bloch | |
| 9,435,206 B2 * | 9/2016 | Johnson | F01D 5/084 |
| 9,435,259 B2 | 9/2016 | Suciu et al. | |
| 9,546,603 B2 | 1/2017 | Meier et al. | |
| 9,945,248 B2 | 4/2018 | McCaffrey | |
| 2002/0153241 A1 | 10/2002 | Niv et al. | |
| 2003/0134800 A1 | 7/2003 | Yamamoto et al. | |
| 2003/0159412 A1 | 8/2003 | North | |
| 2003/0235272 A1 | 12/2003 | Appleby et al. | |
| 2004/0103785 A1 | 6/2004 | North | |
| 2004/0221720 A1 * | 11/2004 | Anderson | F01D 25/32 95/272 |
| 2005/0194295 A1 | 9/2005 | North | |
| 2006/0086669 A1 | 4/2006 | Jack et al. | |
| 2007/0062374 A1 | 3/2007 | Kolle | |
| 2008/0041064 A1 | 2/2008 | Moore et al. | |
| 2008/0073600 A1 | 3/2008 | Appleby et al. | |
| 2008/0095625 A1 | 4/2008 | Honegger et al. | |
| 2008/0152500 A1 | 6/2008 | Mehring | |
| 2008/0236616 A1 | 10/2008 | Bloch | |
| 2008/0310951 A1 | 12/2008 | Bremer | |
| 2009/0005318 A1 | 1/2009 | Yamamoto et al. | |
| 2009/0145101 A1 | 6/2009 | Suciu et al. | |
| 2009/0255230 A1 | 10/2009 | Mildner | |
| 2010/0163232 A1 | 7/2010 | Kolle | |
| 2010/0275612 A1 | 11/2010 | Smoke et al. | |
| 2010/0292524 A1 | 11/2010 | Turner et al. | |
| 2011/0039002 A1 | 2/2011 | Verkoeijen et al. | |
| 2011/0067378 A1 * | 3/2011 | Tibbott | F02C 7/18 60/39.091 |
| 2011/0067409 A1 | 3/2011 | Beeck | |
| 2011/0166084 A1 | 7/2011 | Yamamoto et al. | |
| 2011/0189440 A1 | 8/2011 | Appleby et al. | |
| 2011/0247345 A1 | 10/2011 | Laurello et al. | |
| 2012/0082568 A1 | 4/2012 | Tibbott et al. | |
| 2012/0145051 A1 | 6/2012 | Sweeney | |
| 2012/0283187 A1 | 11/2012 | Yamamoto et al. | |
| 2012/0311814 A1 | 12/2012 | Kah, Jr. | |
| 2013/0098061 A1 | 4/2013 | Matwey et al. | |
| 2013/0338267 A1 | 12/2013 | Appleby et al. | |
| 2014/0072420 A1 | 3/2014 | Johnson et al. | |
| 2014/0123978 A1 | 5/2014 | Bancroft et al. | |
| 2014/0174477 A1 | 6/2014 | Bloch | |
| 2014/0174559 A1 | 6/2014 | Bloch | |
| 2014/0223908 A1 | 8/2014 | Sweeney | |
| 2014/0230862 A1 | 8/2014 | Bloch | |
| 2014/0237839 A1 | 8/2014 | Bloch | |
| 2014/0238507 A1 | 8/2014 | Bloch | |
| 2014/0271820 A1 | 8/2014 | McGhee | |
| 2014/0290254 A1 * | 10/2014 | Manning | F01D 9/02 60/752 |
| 2015/0024169 A1 | 1/2015 | Martin | |
| 2015/0024309 A1 | 1/2015 | Martin | |
| 2015/0024319 A1 | 1/2015 | Martin | |
| 2015/0227062 A1 | 8/2015 | Martin | |
| 2015/0227070 A1 | 8/2015 | Martin | |
| 2015/0275690 A1 | 10/2015 | McCaffrey | |
| 2015/0345331 A1 | 12/2015 | Murray et al. | |
| 2015/0354461 A1 | 12/2015 | Meier et al. | |

(56) References Cited

U.S. PATENT DOCUMENTS

| | | |
|---|---|---|
| 2016/0123154 A1 | 5/2016 | Manning et al. |
| 2016/0273370 A1 | 9/2016 | Belshaw |
| 2017/0082026 A1 | 3/2017 | Zelesky |
| 2017/0122202 A1 | 5/2017 | Rahaim et al. |

FOREIGN PATENT DOCUMENTS

| | | |
|---|---|---|
| CN | 101059083 | 10/2007 |
| CN | 101506474 | 8/2009 |
| CN | 102691532 | 9/2012 |
| EP | 122795 | 10/1984 |
| EP | 795689 | 9/1997 |
| EP | 868594 | 1/2000 |
| EP | 1832751 | 9/2007 |
| EP | 1028808 | 8/2008 |
| EP | 2449309 | 5/2012 |
| EP | 2503101 | 9/2012 |
| EP | 2584142 | 4/2013 |
| EP | 2949880 | 2/2015 |
| WO | 1997023707 | 7/1997 |
| WO | 1999012647 | 3/1999 |
| WO | 1999033557 | 7/1999 |
| WO | 2002082488 | 10/2002 |
| WO | 2005068796 | 7/2005 |
| WO | 2006032141 | 3/2006 |
| WO | 2008118450 | 10/2008 |
| WO | 2009066537 | 5/2009 |
| WO | 2009090249 | 7/2009 |
| WO | 2011000513 | 1/2011 |
| WO | 2012125593 | 9/2012 |
| WO | 2012171005 | 12/2012 |
| WO | 201459760 | 10/2014 |
| WO | 2015009788 | 1/2015 |
| WO | 2015009789 | 1/2015 |

OTHER PUBLICATIONS

United States Patent and Trademark Office, "Notice of Allowance," issued in connection with U.S. Appl. No. 15/291,106, dated Mar. 20, 2020, 17 pages.

United States Patent and Trademark Office, "Non-Final Office action," issued in connection with U.S. Appl. No. 15/291,106, dated Oct. 4, 2019, 32 pages.

United States Patent and Trademark Office, "Advisory action," issued in connection with U.S. Appl. No. 15/291,106, dated Aug. 14, 2019, 4 pages.

United States Patent and Trademark Office, "Final Office action," issued in connection with U.S. Appl. No. 15/291,106, dated May 22, 2019, 16 pages.

United States Patent and Trademark Office, "Non-Final Office action," issued in connection with U.S. Appl. No. 15/291,106, dated Nov. 15, 2018, 22 pages.

United States Patent and Trademark Office,"Restriction Requirement," issued in connection with U.S. Appl. No. 15/291,106, dated Aug. 7, 2018, 8 pages.

Chinese Patent Office,"Office action," issued in connection with Chinese patent application No. 201710950227.6, dated Jun. 2, 2020, 17 pages.

Chinese Patent Office,"Office action," issued in connection with Chinese patent application No. 201710950227.6, dated Sep. 6, 2019, 15 pages.

Chinese Patent Office,"Notice of Allowance," issued in connection with Chinese patent application No. 201710950227.6, dated Aug. 11, 2020, 6 pages.

* cited by examiner

TURBINE ENGINE INDUCER ASSEMBLY

CROSS-REFERENCE TO RELATED APPLICATIONS

This patent claims priority as a continuation to U.S. Non-Provisional application Ser. No. 15/291,106 entitled "TURBINE ENGINE INDUCER ASSEMBLY" which was filed on Oct. 12, 2016, and is hereby incorporated herein by reference in its entirety.

BACKGROUND OF THE INVENTION

Turbine engines, particularly gas or combustion turbine engines, are rotary engines that extract energy from a flow of combusted gases passing through the engine onto a multitude of rotating turbine blades.

Gas turbine engines utilize a mainstream flow to drive the rotating turbine blades to generate thrust. The mainstream flow is propelled by combustion of gas to increase the thrust generated by the engine. The combustion of gas generates excessive temperatures within the engine turbine, requiring cooling or certain components. Such cooling can be accomplished through providing air from the mainstream flow bypassing the combustor.

Air bypassing the combustor moves in a substantially axial flow. In order to minimize losses from the substantially axial flow provided to rotating rotor elements or integrating in to a swirling flow, an inducer can turn the axial, bypass flow to have a swirling, tangential component.

A typical inducer is a complex annular structure, requiring significant dismantling of the turbine engine in order to examine, service, or replace the inducer or specific inducer components.

BRIEF DESCRIPTION OF THE INVENTION

In one aspect, embodiments of the invention relate to a turbine engine including an engine core having a compressor section, a combustor section, and a turbine section in axial flow arrangement. The turbine engine further includes a cooling air circuit fluidly coupling the compressor section to the turbine section changing a cooling airflow passing through the combustor section from an axial flow into a circumferential flow entering the turbine section. The turbine engine further includes an inducer assembly forming at least a part of the cooling air circuit and having multiple inducers organized as at least one set of doublets, with each doublet having two inducers.

In another aspect, embodiments of the invention relate to a segmented inducer assembly for a turbine engine including multiple segments forming an annulus including at least one turning passage with the at least one turning passage having an inlet and an outlet defining a flow path and at least one inducer forming at least a portion of the multiple segments. The multiple segments are formed by additive manufacturing.

In yet another aspect, embodiments of the invention relate to a method of assembling an inducer assembly for a turbine engine including circumferentially coupling multiple inducer doublets to form an annular inducer assembly.

DESCRIPTION OF EMBODIMENTS OF THE INVENTION

Figure 1:
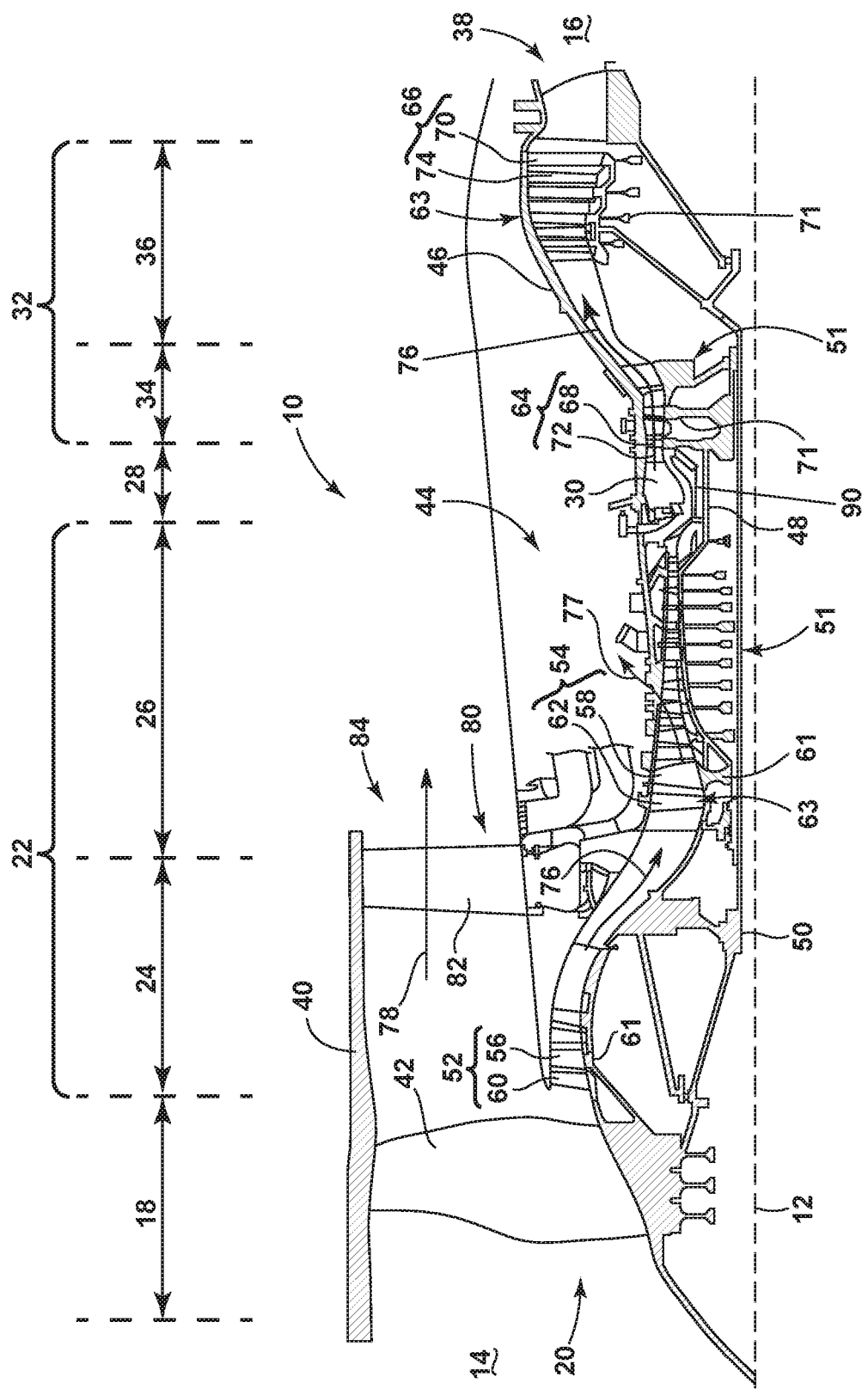
FIG. 1 is a schematic cross-sectional diagram of a gas turbine engine for an aircraft.

The described embodiments of the present invention are directed to an inducer assembly for imparting a rotational magnitude on a substantially axial flow of air within a turbine engine. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

An inducer assembly 90 is positioned radially within the combustion section 28. The inducer assembly 90 fluidly couples the compressor section 22 to the turbine section 32, bypassing the combustor 30. As such, the inducer assembly 90 can provide a flow of air to the turbine section 32 as a temperature much lower than that provided from the combustor 30. Additionally, the inducer assembly 90 induces a rotation on the flow of air bypassing the combustor 30, in order to provide a rotating airflow to the turbine section 32 as opposed to an axial flow. The rotating airflow minimizes losses resultant from integrating the bypass flow into the rotating mainstream airflow 76.

Figure 2:
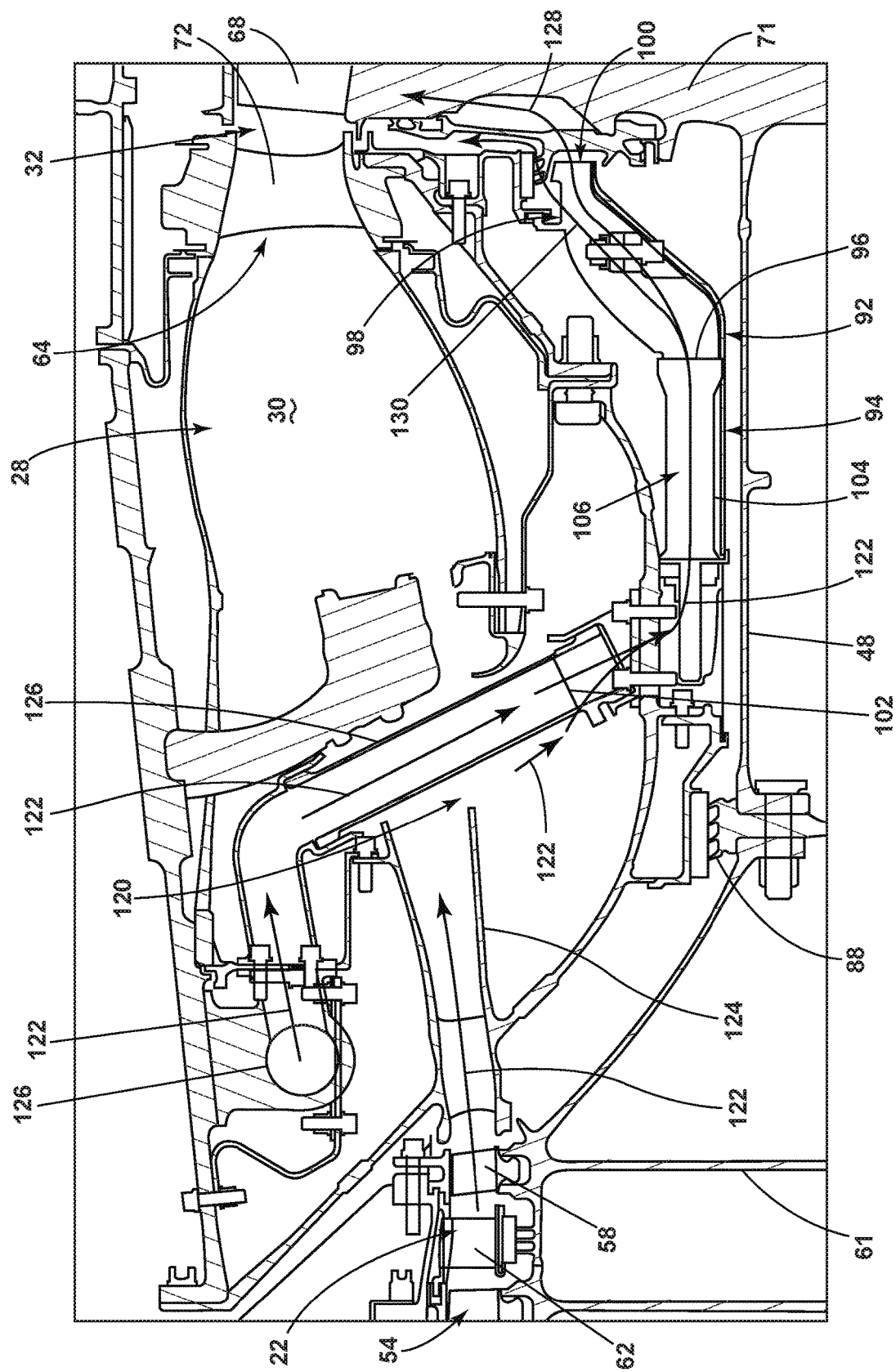
FIG. 2 is an enlarged view of an inducer bypassing a combustion section of the engine of FIG. 1.

Referring now to FIG. 2, an enlarged view of the inducer assembly 90 is disposed between the compressor section 22 and the turbine section 32, radially within the combustor section 28. The inducer assembly 90 can mount radially around the HP spool 48, having at least one seal 88 disposed between the inducer assembly 90 and the HP spool 48. The inducer assembly 90 can include an inducer 92 and a particle separator 94. The inducer 92 can include an inlet 96, a turbine outlet 98, and a scavenge outlet 100. The turbine outlet 98 couples to the disk 71 of the HP turbine first stage 64, fluidly coupling to the HP turbine first stage blade 68. The scavenge outlet 100 of the inducer 92 fluidly couples to the first HP turbine stage 64 between the HP turbine vane 72 and the HP turbine blade 68. The particle separator 94 can include an inlet 102, a body 104 defining an interior 106, and an outlet 108. The outlet 108 of the particle separator couples to the inlet of the inducer 92, fluidly coupling the particle separator 94 to the inducer 92.

A cooling air circuit 120 fluidly couples the compressor section 22 to the turbine section 32 through the inducer assembly 90. A flow of cooling air 122 can be provided from the compressor section 22 through an outlet guide vane 124, or from a bypass channel 126 disposed exterior of the engine core 44, or a combination thereof. The flow of air 122 can be cool relative to the temperature of the combusted air from the combustor 30. As such, the flow of air 122 may not be cool or cold, but colder relative to the temperature of the combusted air from the combustor 30. The flow of air 122 is provided to the inducer assembly 90 through the inlet 102 of the particle separator 94. In the particle separator 94, the flow of air 122 is separated into a cleaner airflow 128 and a scavenge airflow 130. The cleaner airflow 128 includes a reduced particle count and the scavenge airflow 130 includes an increased particle count as compared to the flow of air 122. The particle separator removes the particle count from the cleaner airflow 128, which increases the particle count in the scavenge airflow 130. The scavenge outlet 100 provides the scavenge airflow 130 to the HP turbine first stage 64. The turbine outlet 98 provides the cleaned airflow 128 to the HP turbine blade 68 or for other component use, such as cooling.

Figure 3:
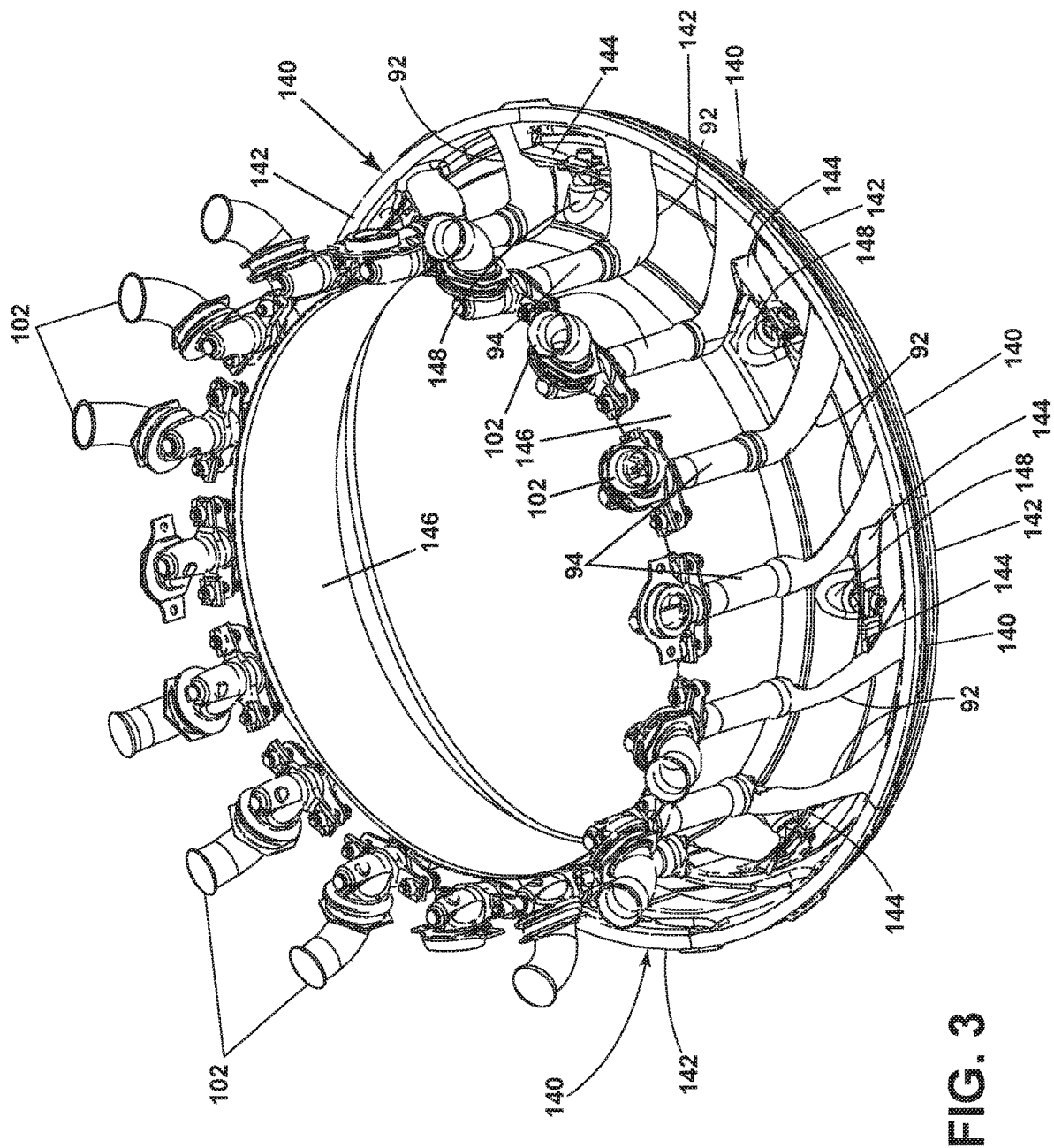
FIG. 3 is a perspective view of the inducer of FIG. 2.

Referring now to FIG. 3, the inducer assembly 90 can include a plurality of inducers 92 coupled to a plurality of particle separators 94 in circumferential arrangement. The inducer assembly 90 includes a set of segments 140. A set as used herein can include two or more modular segments sufficient to form the annular inducer assembly 90. The modular segments 140, as shown in the non-limiting example of FIG. 3, can be doublets 142, and can include multiple doublets, such as eight doublets 142 in one non-limiting example. Each doublet 142 can include a single unitary unit, such as formed by additive manufacturing, as opposed to the combination of separate elements to form the doublet 142. Each doublet 142 includes two inducers 92, which couple to two particle separators 94, respectively. Each doublet 142 can further include a set of arms 144. The arms 144 can provide for coupling adjacent doublets 142, or segments 140, to form the annular inducer assembly 90. While the segments 140 are described herein relative to doublets 142, it should be appreciated that the set of segments can include the coupling of singlets, triplets, quadruplets, or any other number of segments, which may or may not be defined by the number of inducers 92 attached thereto, such that the annular inducer assembly 90 is formed.

A windage cover 146 can couple to the inducer assembly 90. Seats 148 can be formed in the windage cover 146 adapted to couple to the remaining components of the inducer assembly 90 at the arms 144. The windage cover 146 provides for preventing the flow of air from bypassing the inducer assembly 90 without building the structure into the inducer assembly 90. The windage cover 146 maintains engine efficiency while minimizing cost and complexity of the inducer assembly 90.

Figure 4:
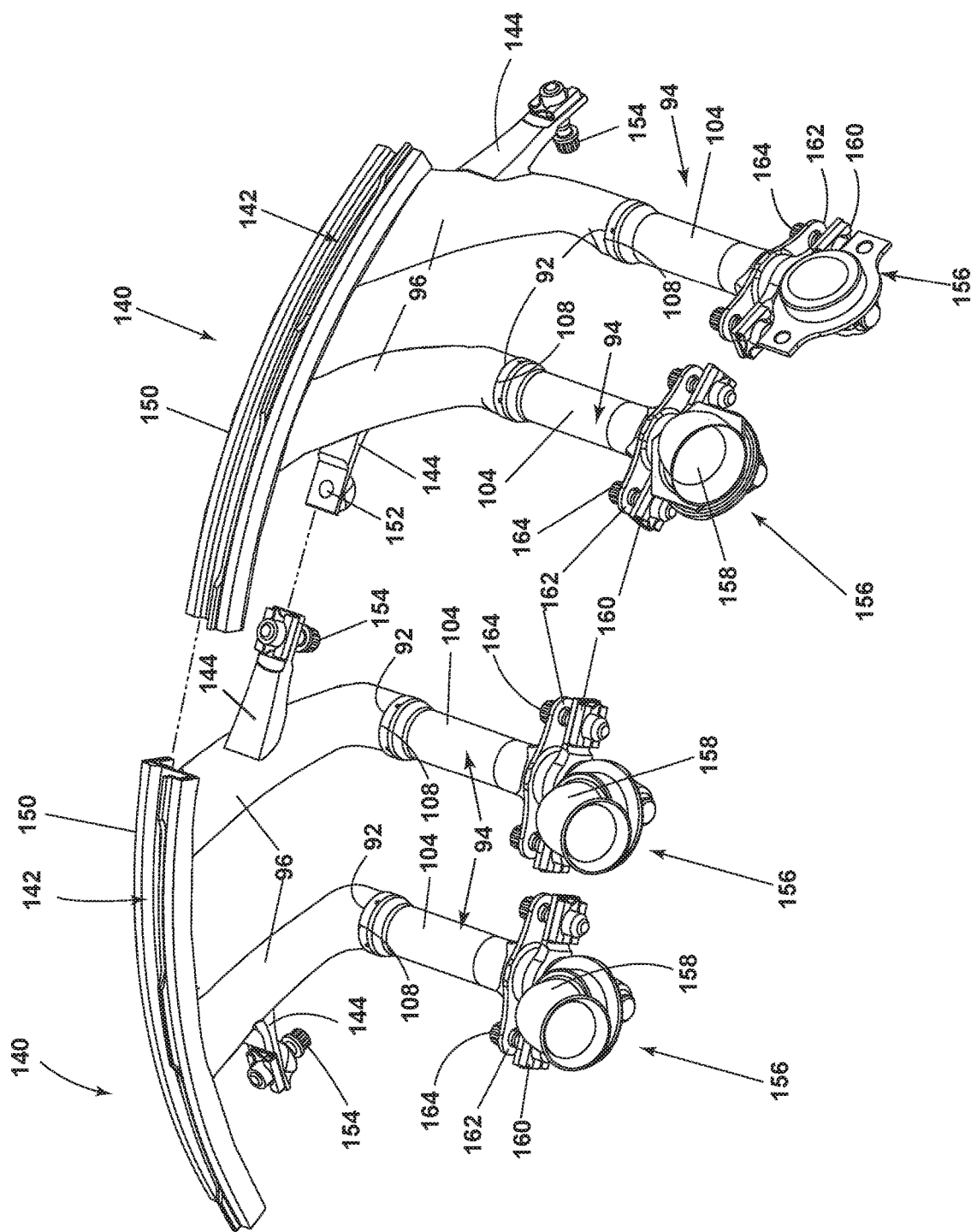
FIG. 4 is an exploded, perspective view of two segments of the inducer of FIG. 3.

FIG. 4 illustrates two uncoupled doublets 142. The doublets 142 include a band 150. The band 150 provides structure for coupling the inducers 92 and defines the annular shape for the inducer assembly 90. Apertures 152 are disposed in the arms 144 for receiving a fastener 154 to secure adjacent doublets 142. The inlet 96 of the inducers 92 couples to the outlet 108 of the particle separator 94. An inlet conditioner 156, having an inlet tube 158 and a first flange 160 couples to the body 104 of the particle separator 94 at a second flange 162. A fastener 164 couples the inlet conditioner 156 to the particle separator 94 by fastening the first and second flanges 160, 162.

Figure 5:
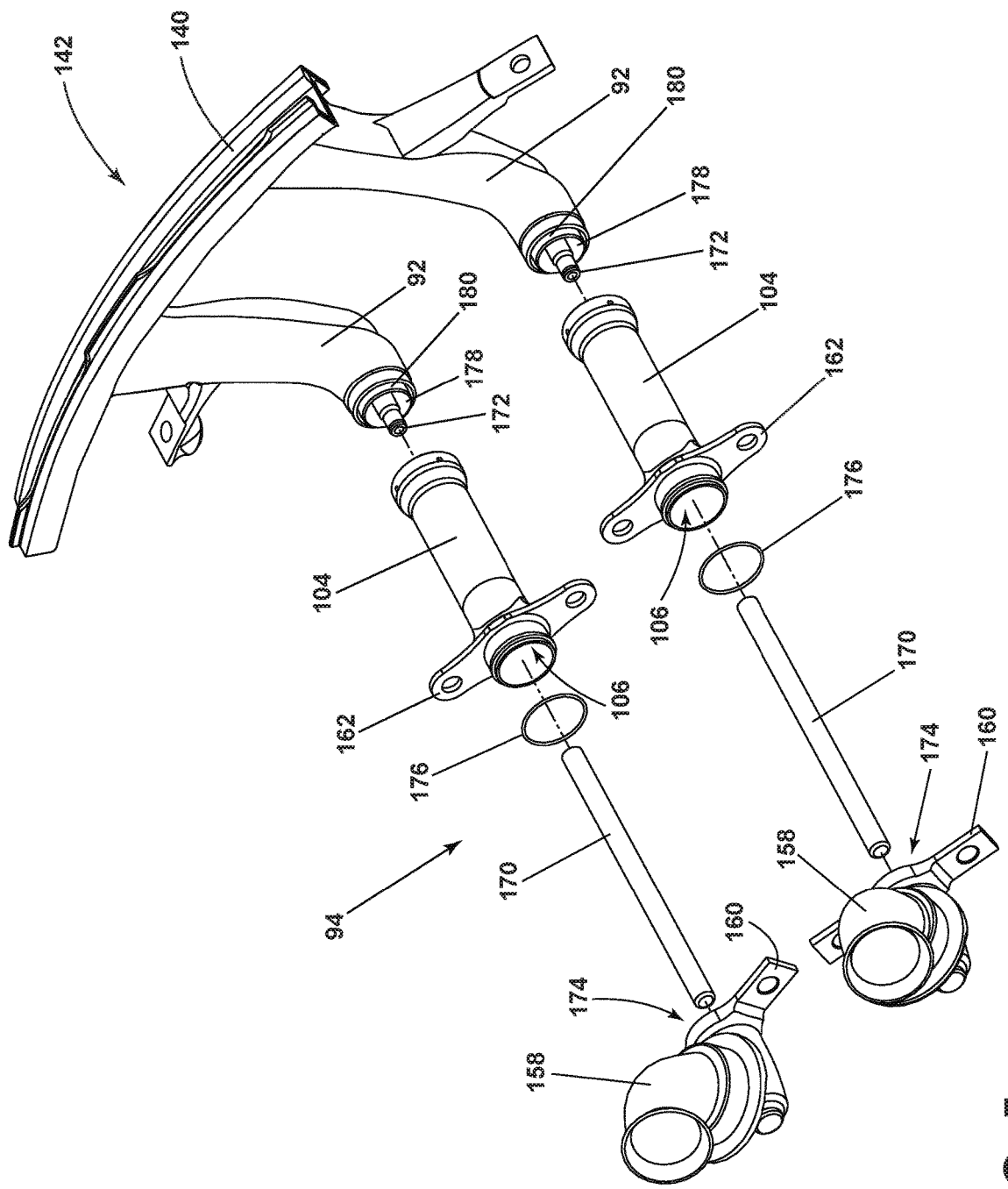
FIG. 5 is a view of one segment of the inducer of FIG. 3, having a particle separator exploded therefrom.

Referring now to FIG. 5, the particle separators 94 have been exploded from the doublet 142. The body 104 houses a centerbody 170 disposed within the interior 106. A first seat 172 at the inlet 96 of the inducers 92 receives one end of the centerbody 170, while a second seat 174 (see also, FIG. 6) disposed in the inlet conditioner 156 receives the opposing end of the centerbody 170. A seal ring 176 seals the inlet 102 to the inlet conditioner 156.

The inlet 96 of the inducers 92 includes a first inlet passage 178 and a second inlet passage 180. The first inlet passage 178 is disposed radially outside of the second inlet passage 180. The first inlet passage 178 can fluidly couple to the scavenge outlet 100 and the second inlet passage 180 can couple to the turbine outlet 98 (FIG. 2).

In the exploded view of FIG. 5, it should be appreciated that the inducer assembly 90 can be a modular assembly, being a combination of multiple interchangeable parts to form the complete inducer assembly 90. The modular assembly facilitates servicing and maintenance of the inducer assembly 90, facilitating assembly and disassembly. Additionally, costs can be reduced by replacing a single modular part as opposed to replacing the entire inducer. Furthermore, the modular inducer assembly 90 can include elements that are quickly interchangeable in order to retrofit or adapt the inducer assembly 90 to a particular need or environment. For example, the internal cross-sectional area of the inducers 92 can be adapted to meter the flows provided by the inducer 92. Similarly, the cross-sectional area of the first and second inlet passages 178, 180 can be modified by quick replacement of the modular part. In yet another example, the modular parts for the particle separator 94 can be interchanged to be sensitive to variable conditions, such as dusty or sandy environments requiring improved particle separation, such as effectively removing particulate matter at a smaller size. As such, the inducer assembly 90 can be tailored on-site to local environments. Additionally, existing inducer assemblies 90 can be retrofitted with modular replacement parts for easy of servicing or adapting to local needs or conditions. It should be appreciated that additive manufacturing enables manufacture of the complex elements, such as the doublet 142, at reduced cost and improved accuracy.

Figure 6:
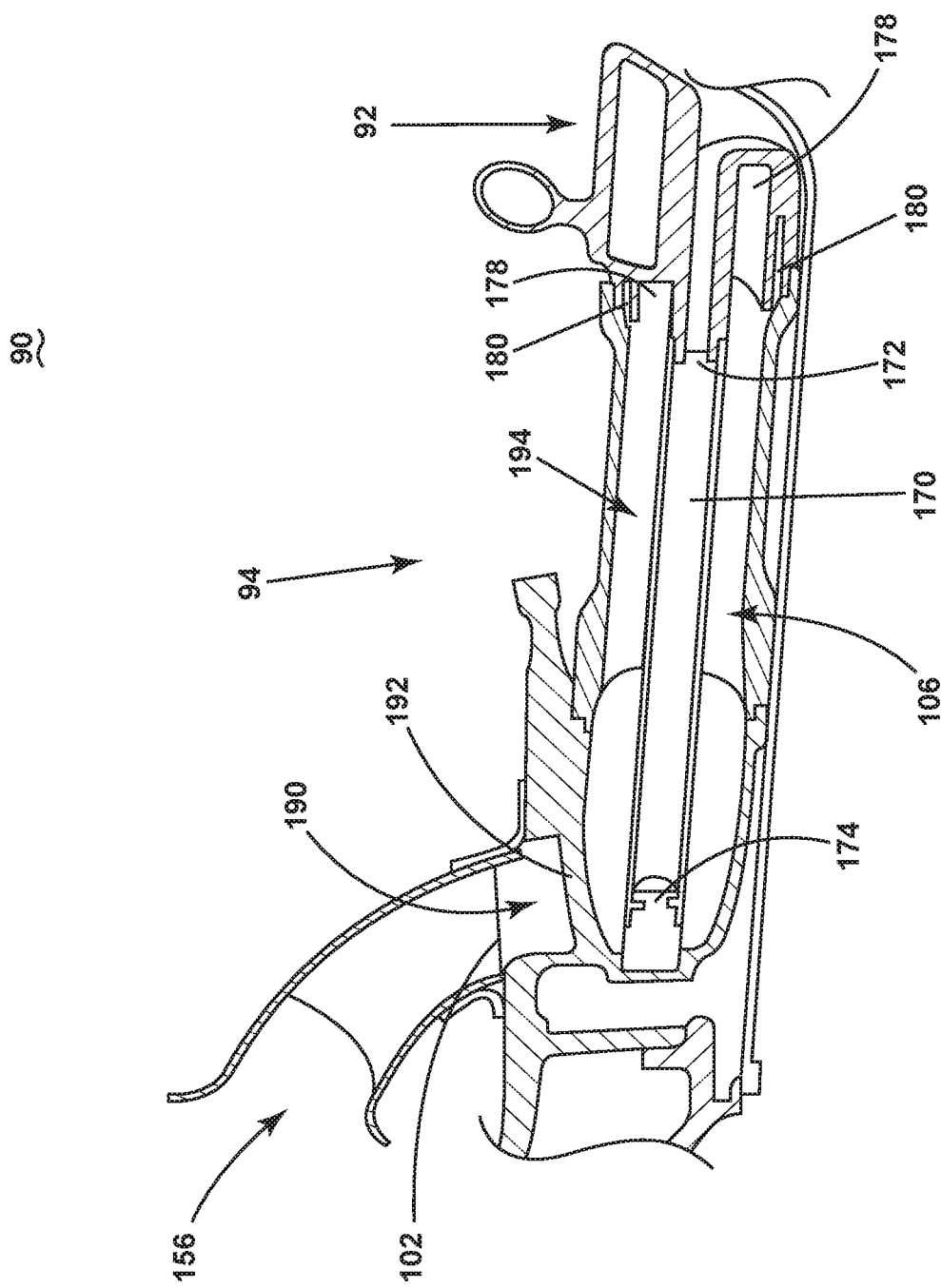
FIG. 6 is a cross-sectional view of the particle separator of FIG. 5 coupled to the inducer.

Turning now to FIG. 6, a cross-sectional view of the particle separator 94 coupled to inducer 92 at the inlet passages 178, 180 illustrates the connection of particle separator to the inducer 92. The annular inlet conditioner 156 mounts to the inlet 102 of the particle separator 94 defining an interior 190. The interior 190 is in fluid communication with the interior 106 of the particle separator 94. A rib 192 extends partially across the interior 190.

The centerbody 170 is disposed within the interior 106, mounted between the first and second seats 172, 174. The centerbody 170 defines an annular cyclonic separating chamber 194 within the interior disposed radially around the centerbody 170. The annular cyclonic separating chamber 194 is fluidly coupled to the first and second inlet passages 178, 180 of the inducer 92.

Figure 7:
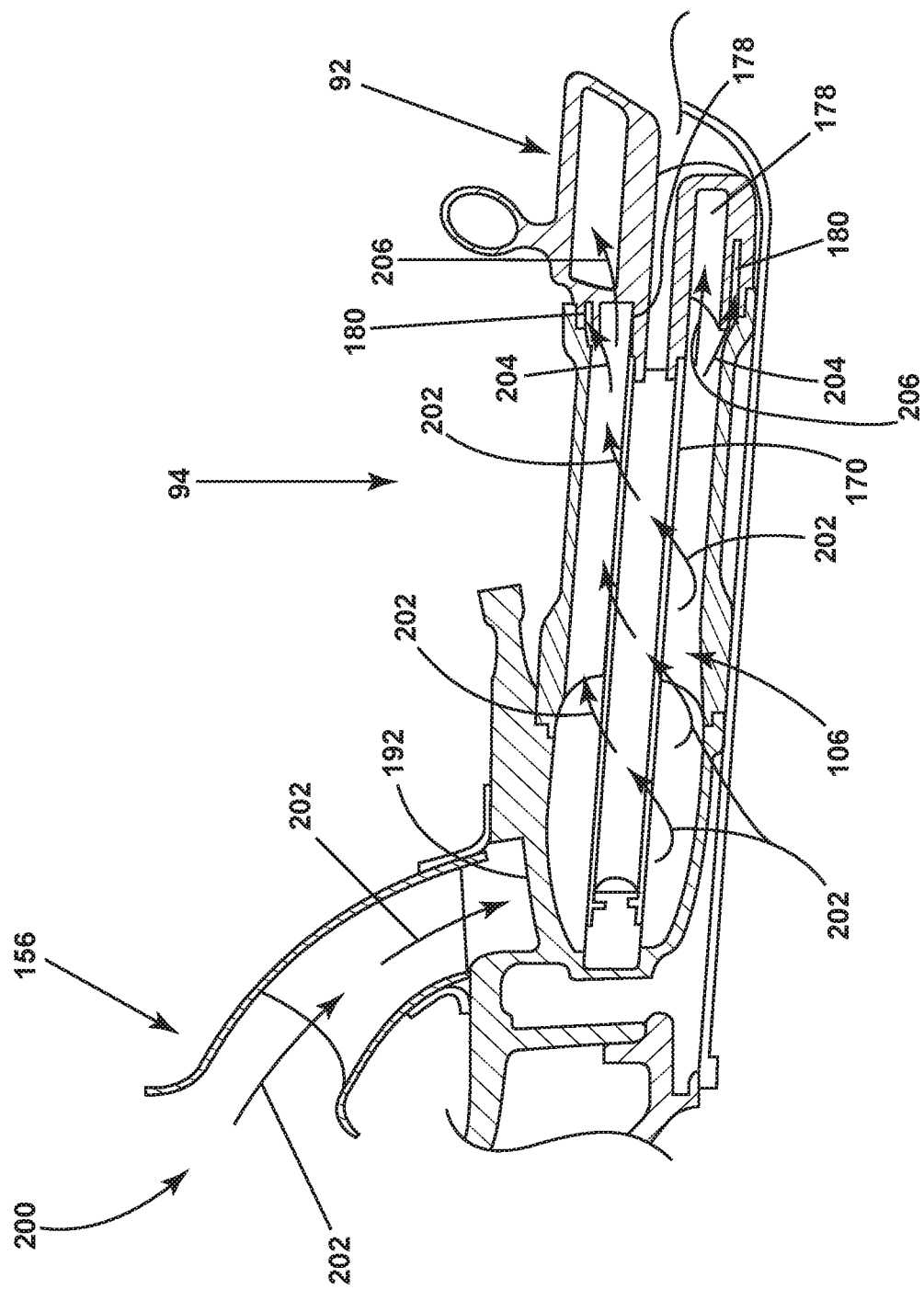
FIG. 7 is a cross-sectional view of FIG. 6 illustrating a flow path within the particle separator and inducer.

Turning now to FIG. 7, the cross-sectional view FIG. 6 is illustrated including a flow path 200. A flow of fluid 202 is provided to the inlet conditioner 156, such as fluid from the cooling air circuit 120 (FIG. 2). The inlet conditioner 156 provides the flow of fluid 202 into the interior 106 of the particle separator 94. The rib 192 of the inlet conditioner 156 provides the flow 202 into the interior 106 tangentially directing the flow 202 toward one side of the annular cyclonic separating chamber 194. As the flow 202 enters the annular cyclonic separating chamber 194 tangentially, the flow 202 swirls around the centerbody 170 within the interior 106. The flow 202 swirls around the centerbody 170, while moving axially toward the inducer 92. As the flow 202 swirls, any particulate matter entrained within the flow 202 will move radially outward from the centerbody 170 resultant of the centrifugal force on the swirling particulate matter. As such, the flow 202 can be separated into a scavenge flow 204 and a cleaner flow 206. The scavenge flow 204 includes a majority of the particulate matter, located at the radial outermost area of the annular cyclonic separating chamber 194, adjacent the body 104. The cleaner flow 206 has a portion of the particulate matter removed by the centrifugal force on the matter, maintaining the matter within the scavenge flow 204, and is defined within the radial interior of annular cyclonic separating chamber 194 adjacent the centerbody 170.

The interior 106 is in fluid communication with the first and second inlet passages 178, 180 of the inducer 92. The scavenge flow 204 is provided to the second inlet passage 180 and the cleaner flow 206 is provided to the first inlet passage 178. The inducer 92 provides the scavenge flow 204 to the first stage of the HP turbine and the cleaner flow 206 to the first stage turbine blade for the HP turbine through the scavenge outlet 98 and the cleaner air outlet 100, respectively (FIG. 2).

Figure 8:
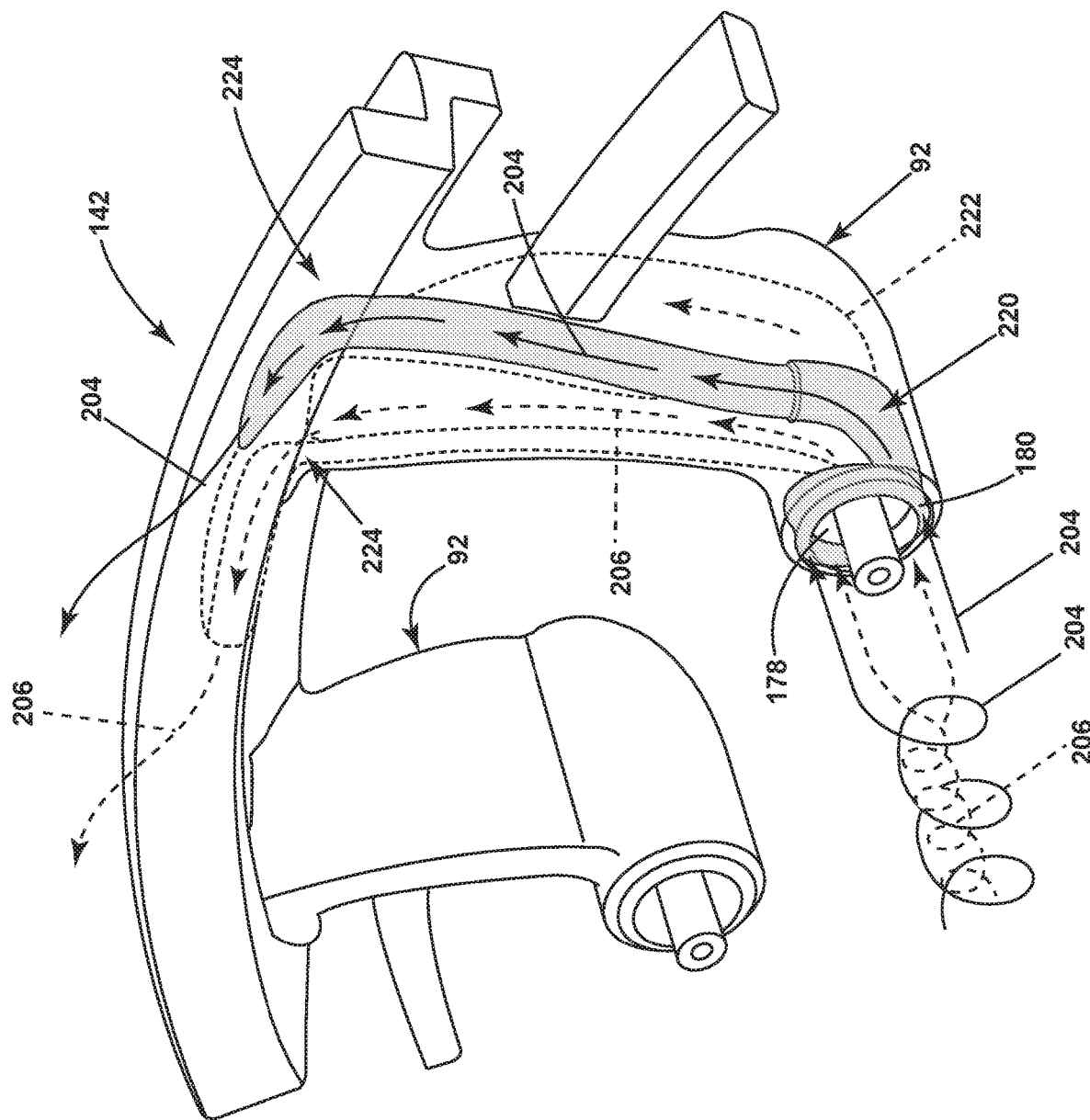
FIG. 8 is a perspective view of one segment of FIG. 4, illustrating a flow moving through a turning passage and a scavenge passage.

Referring now to FIG. 8, each inducer 92 in the doublet 142 can include two turning passages illustrated as a scavenge passage 220 and the cleaner air passage 222, having two of each passage per doublet 142. Each turning passage 220, 222 can include an inlet and an outlet. The inlets for the scavenge and cleaner passages 220, 222 can be the second and first inlet passages 178, 180, receiving the cleaner air flow 206 and the scavenge flow 204, respectively. The passages 220, 222 each include a turn 224. The passages 220, 222 can define a flow streamline for the flows 204, 206, and, at the turn 224 induce a tangential component on the airflows, relative to the axial orientation of the engine, bypassing the combustor in order to provide the bypass air to the turbine section having a both an axial and a swirling direction. Each passage 220, 222 can include an outlet to provide the flows 204, 206 to the turbine section having the tangential component. Such a movement of the air provides for integrating the air with the swirling movement of the mainstream airflow through the engine to reduce any losses associated with the differentials between airflow directions.

Figure 9:
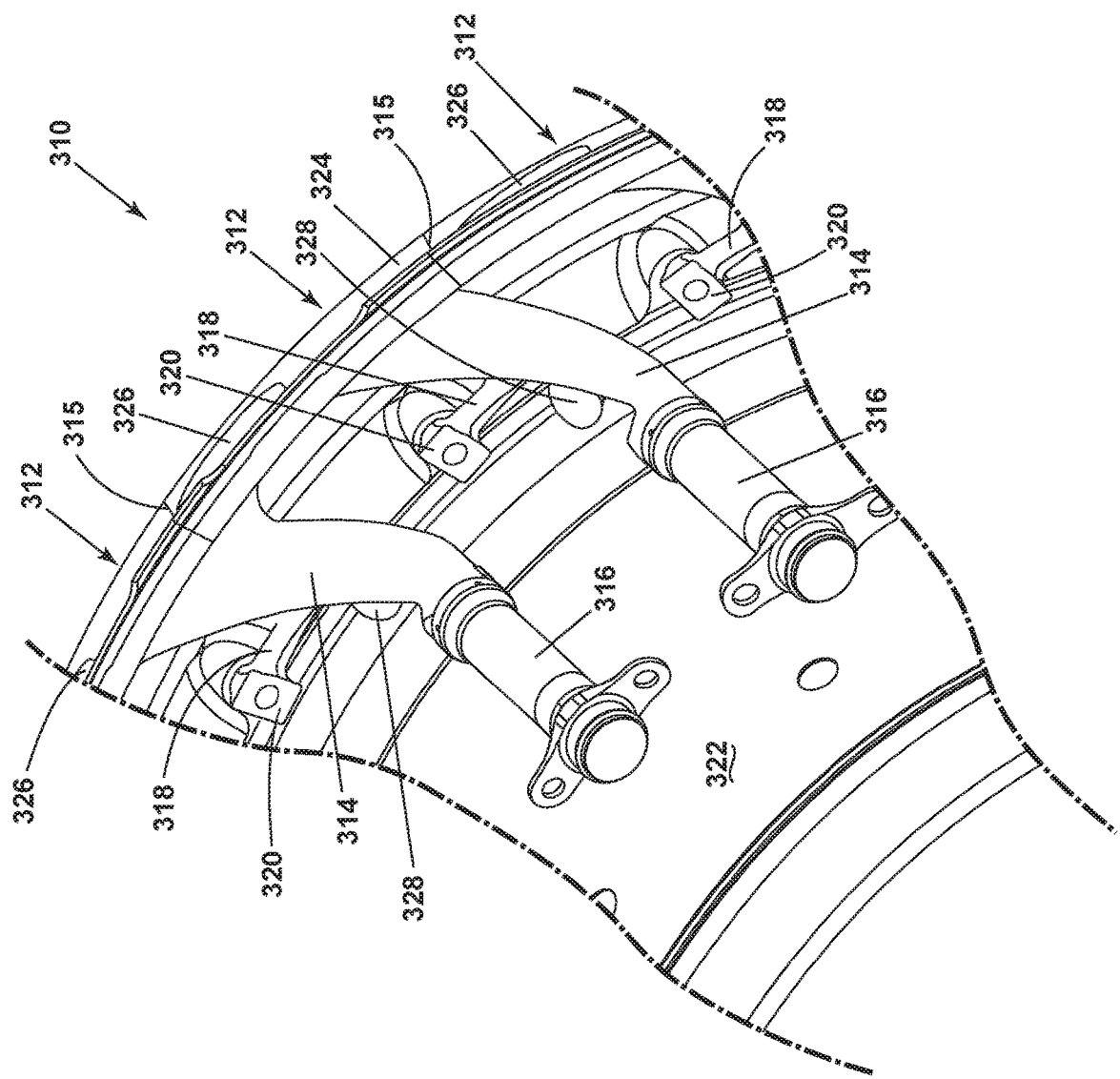
FIG. 9 is a perspective view of an inducer assembly organized into singlets, including a disk web swirler.

Referring now to FIG. 9, a portion of another exemplary inducer assembly 310 is illustrated. The inducer assembly 310 can be formed from a combination of multiple singlets 312, such as sixteen singlets 312 in annular arrangement in one non-limiting example. The singlets 312 can include a single inducer 314 and a single coupled particle separator 316. The singlets 312 can be separable at a break 315. The inducer 314 can include an arm 318 having a fastener 320 at an end of the arm 318. The fastener 320 can couple the inducer assembly 310 to a windage cover 322 via the arm 318 from the multiple singlets 312, mounting the inducer assembly 310 to the engine core 44 (FIG. 1) at the windage cover 322. Each singlet 312 includes a band 324 with and outlet 326 provided in the band 324. The bands 324 can adjoin at the breaks 315. The outlet 326 can provide cooling air from the inducer assembly 310 to aft portions of the engine 10, such as the rotor or the high pressure turbine 34 (see FIG. 1).

The inducer assembly 310 further includes one or more disk web swirlers 328. The disk web swirler 328 can fluidly couple to the inducer 314 for providing a volume of fluid from the inducer assembly 310 bypassing the windage cover 322 and exhausting to the high pressure turbine rotor disk 71 (FIG. 1). It should be appreciated that the disk web swirler 328 should not be limited to a disk-shape, but can be any shape, such as a ring, annular member, or cylinder in non-limiting examples.

Figure 10:
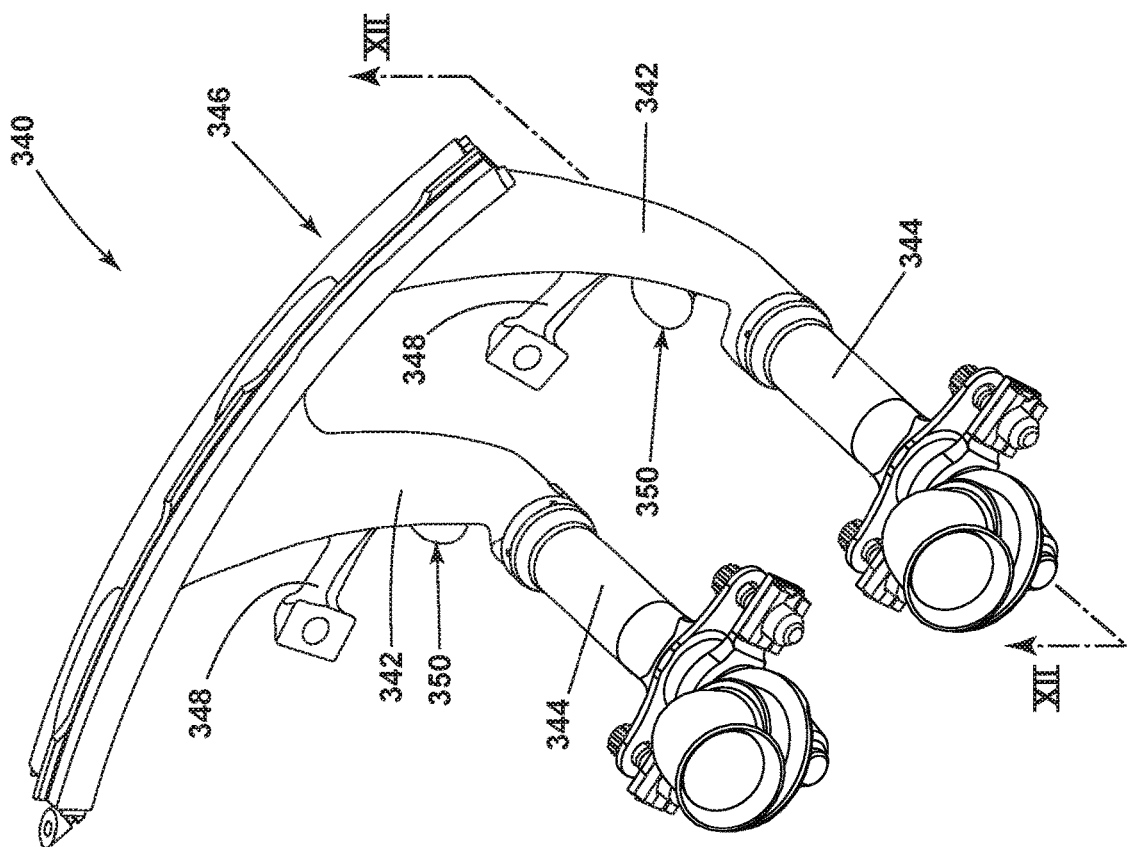
FIG. 10 is an isolated perspective view of an inducer assembly organized as a doublet including a disk web swirler.

Referring now to FIG. 10, a portion of another inducer assembly 340 is illustrated having two inducers 342 and two particle separators 344 organized into a doublet 346. The doublets 346 can be substantially similar to the doublets as described herein (see FIGS. 4, 5, and 8, for example). However, the inducer assembly 340 in FIG. 10 includes arms 348 provided on each inducer 342 for mounting the inducer assembly 340. In one example, the arms 348 can mount the doublet 346 to a windage cover 146, 322, such as the windage covers 146, 322 described herein. Each inducer 342 further includes a disk web swirler 350 for providing a bypass flow to the high pressure turbine rotor disk, for example.

Figure 11:
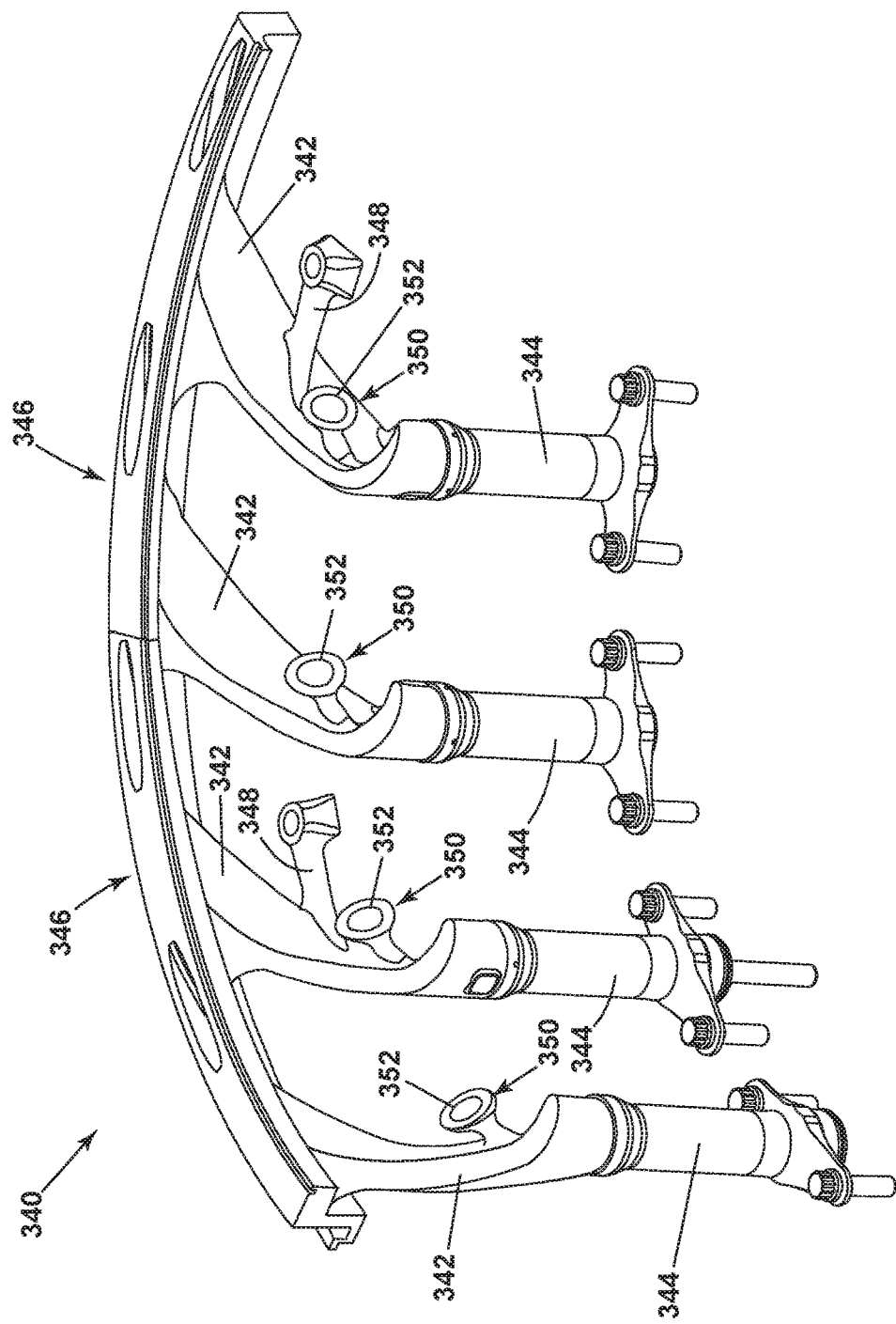
FIG. 11 is a rear isolated perspective view of the inducer assembly of FIG. 10, illustrating outlets of the disk web swirler.

Referring now to FIG. 11, illustrating a rear perspective view of the inducer assembly 340 of FIG. 10, each disk web swirler 350 includes a disk outlet 352. In one example, the disk outlet 352 can bypass a windage cover 378 (FIG. 12), such as extending through the windage cover 378, for providing a volume of bleed air to the rotor cavity at the high pressure turbine, which would otherwise be prevented by the windage cover 378. In such an example, the dish web swirler 350 can extend through the windage cover 378, utilizing a seal to prevent leakage. The dish web swirler 350 can further provide the volume of bleed air to the rotor cavity have a rotational magnitude on the airflow, such as including a tangential component. Thus, the rotating airflow in the rotor cavity will not reduce efficiency during interaction with the rotating rotor 71 (FIG. 1). The rotor disk web can provide for improved creep life while maintaining efficiency.

Each doublet 346 can include a single arm 348 attached to one inducer 342, or can include any number of arms 348 to properly mount the doublets 346 to one another, a windage cover, or the engine core in any other manner.

Figure 12:
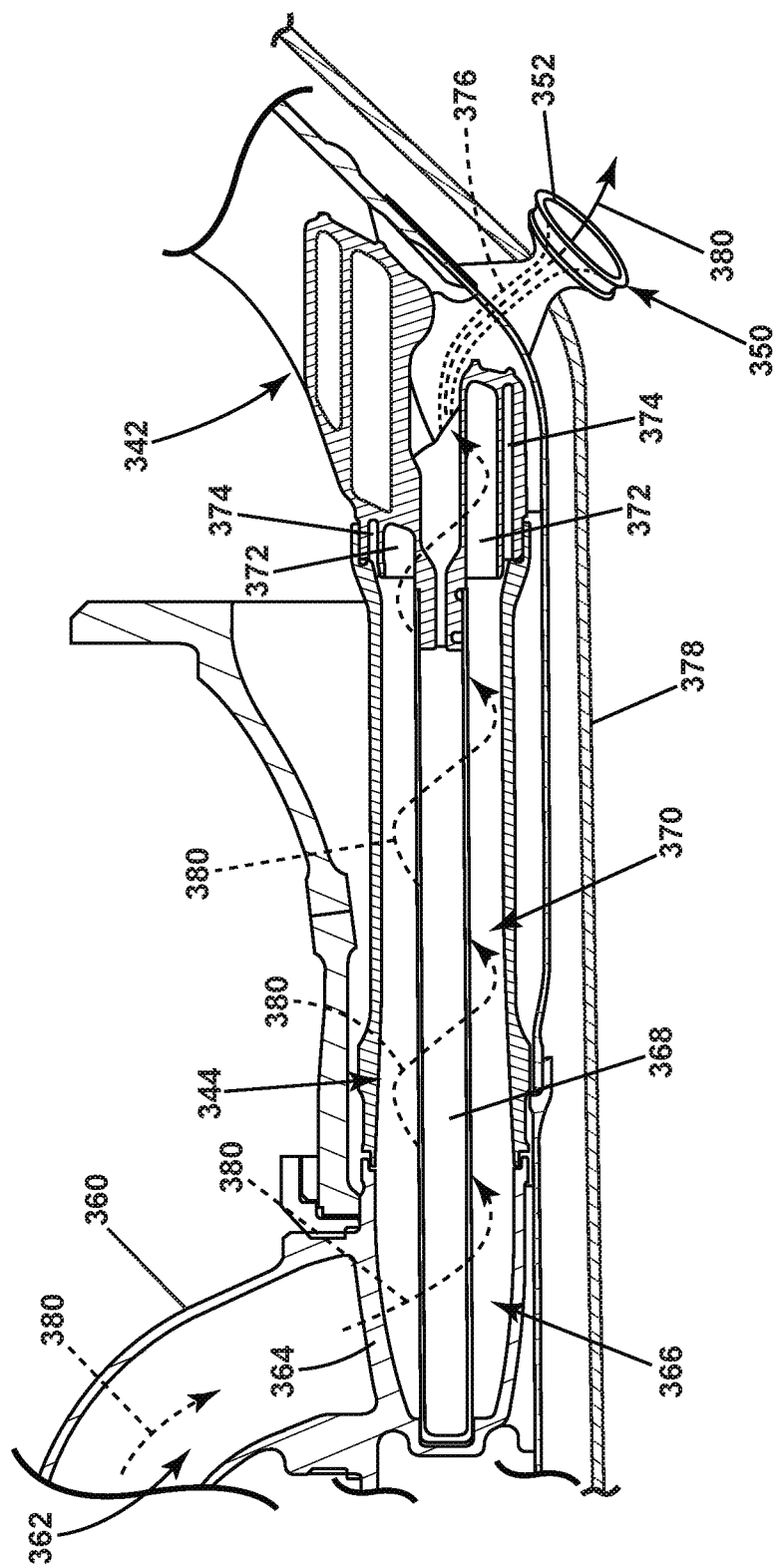
FIG. 12 is a cross-sectional view of an inducer of FIG. 10, illustrating a flow path fluidly coupling a particle separator outlet to the disk web swirler.

Referring now to FIG. 12, illustrating a section view taken across section XII-XII of FIG. 10 including a windage cover 378, the interior of the particle separator 344, and the inducer 342 can be substantially similar to that of FIG. 6, including an inlet conditioner 360 defining an inlet 362, a rib 364, an interior 366 having a centerbody 368 defining a cyclonic separating chamber 370, and first and second inlet passages 372, 374. Additionally, a disk web swirler passage 376 fluidly couples the interior 366 to the disk web swirler 350. The disk web swirler outlet 352 provides for fluidly coupling the inducer assembly 340 to the rotor cavity bypassing the windage cover 378.

In operation, an airflow 380 will be provided to the inducer assembly 340 through the inlet conditioner 360. The rib 364 covers a portion of the inlet conditioner 360 to induce rotation of the airflow 380 upon entering the interior 366, such that the airflow 380 swirls around the centerbody 368, being provided to the first and second inlet passages 372, 374 of the inducer 342. A portion of the airflow 380 will be provided from at least one of the inlet passages 372, 374 to the disk web swirler passage 376 being exhausted through the disk web swirler outlet 352. As such, a portion of the airflow 380 can be provided to the rotor cavity to improve rotor creep life. The air 380 provided through the disk web swirler passage 376 can be a bypass airflow to bypass the inducer assembly 340.

A method of assembling an inducer assembly 90, 310, 340 for the turbine engine 10 can include circumferentially coupling multiple inducers, such as doublets 142, 346 or singlets 312 to form the annular inducer assembly 90, 310, 340. The set of doublets 142 or singlets 312 can include two or more doublets 142, 346 or singlets 312, such as eight sets of doublets 142 or sixteen sets of or singlets 312 in one non-limiting example. Coupling the set of doublets 142, 346 or singlets 312 can include fastening a plurality of arms 144 among adjacent doublets 142, 346 to form the inducer assembly 90, 310, 340, or coupling the arms 318, 348 to the windage cover 322 mounted to the engine stator. The method can further include coupling at least one particle separator 94 the sets of doublets 142, 346 or singlets 312 prior to forming the inducer assembly 90, 310, 340. In one example, each doublet 142, 346 can include two inducers 92, with each inducer 92 coupling to a complementary particle separator 94. As such, each doublet 142, 346 can include two coupled particle separators 94. The method can further include mounting the windage cover 146 to the inducer assembly 90. Additionally, in another example, the inducer assembly 90, 310, 340 can include multiple singlets 312 with a windage cover 322, where forming the inducer assembly 90, 310, 340 includes mounting the singlets 312 to the windage cover 322. Mounting the windage cover 146 to the inducer assembly 90 can include mounting the arms 144 to the windage cover 146.

It should be understood that the inducer assembly 90, 310, 340 and associated parts or elements can be made with additive manufacturing, such as direct metal laser melting (DMLM) printing, to construct the precise elements as described. Such manufacturing can be used to develop the intricate details of the aforementioned, without the poor yields of such manufacturing as casting, or the imperfections associated with other manufacturing methods.

It should be appreciated that the portions of the inducer assembly can be made by additive manufacturing. As such, the combined inducer assembly can include a plurality of individual modular elements. The modular nature of the inducer assembly facilitates maintenance and servicing of the inducer assembly. Additionally, the inducer assembly permits modulation or retrofitting among multiple different engines. For example, an engine requiring a greater flow rate of cooling airflow to the HPT could include inducers having a larger cross-sectional area. Furthermore, the modular inducer assembly can provide for local tailoring of the inducer assembly to suit to local environments, such as increased sandy or dusty conditions.

It should be further appreciated that using the segmented inducer, such as using the doublets as segments, provides for facilitating assembly of the inducer. Additionally, the individual segments can be manufactured, replaced and serviced. Thus, the segmented inducer reduces costs associated with manufacture, repair, and servicing of the inducer assembly, as compared to a typical inducer assembly. Additionally, the segmented inducer can be bolted to the inner structure of the outlet guide vane flange with straight tube-flanges, using L-seals to control leakage. Additionally, the windage cover can be mounted to prevent passage of axial-flowing bypass air to the turbine section, rather than integrating the windage cover into the initial structure of the inducer assembly as opposed to the discrete cover. Furthermore, the overall lifetime of the inducer assembly is increased. Further still, the steps needed to create the internal flow surfaces can minimize or eliminate line-drill operation. Further yet, the windage cover bolting to the arms of the doublets removes the bolt access windows on typical windage structures.

It should be further appreciated that the segmented inducer assembly facilitates the attachment of a particle separator, such as the cyclonic separator as described herein. The cyclonic separator when used in combination with the inducer assembly can improve lifetime of the stage-one blades while avoiding the surface film cooling penalty.

It should be further appreciated that the segmented inducer assembly can be lighter than traditional inducer assemblies. The segmented inducer assembly can be used to retrofit current engines to improve engine efficiency with the weight reduction.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine cooling air circuit comprising:
   an inducer assembly to route a cooling airflow, the inducer assembly having a plurality of interconnected segments collectively forming an annular shape, wherein each segment of the plurality of segments includes a doublet, each doublet including:
   two pairs of a) one inducer including an inducer inlet and an inducer outlet to turn the cooling airflow from an axial direction to a circumferential direction and b) one particle separator including a separator body, a separator inlet, and a separator outlet, wherein the separator outlet couples with the inducer inlet,
   a first arm extending in a first circumferential direction, and
   a second arm extending in a second circumferential direction opposite of the first arm; and
   a windage cover coupled to the inducer assembly to prevent the cooling airflow from bypassing the inducer assembly.

2. The turbine engine cooling air circuit of claim 1, wherein the turbine engine cooling air circuit forms part of an engine core to change the cooling airflow passing through the engine core from an axial flow into a circumferential flow.

3. The turbine engine cooling air circuit of claim 1, wherein the inducer assembly further includes one or more web swirlers.

4. The turbine engine cooling air circuit of claim 3, wherein the one or more web swirlers extend through the windage cover.

5. The turbine engine cooling air circuit of claim 4, wherein the one or more web swirlers is to provide a volume of fluid from the inducer assembly bypassing the windage cover and exhausting to a high pressure turbine rotor.

6. The turbine engine cooling air circuit of claim 1, wherein the windage cover includes a plurality of seats to couple the windage cover to the inducer assembly using at least a third arm.

7. The turbine engine cooling air circuit of claim 6, further including fasteners to couple of the windage cover at the plurality of seats.

8. The turbine engine cooling air circuit of claim 1, wherein each doublet includes a band interconnecting each inducer on each doublet.

9. The turbine engine cooling air circuit of claim 1, wherein the windage cover is connected to the inducers of the inducer assembly.

10. The turbine engine cooling air circuit of claim 1, wherein at least the inducer assembly is formed from direct metal laser melting printing.

11. A turbine engine comprising:
an engine core having a compressor section, combustor section and a turbine section in axial flow arrangement;
an inducer assembly forming at least a portion of a cooling air circuit to route a cooling airflow among at least two of the sections of the engine core, the inducer assembly having a plurality of interconnected segments collectively forming an annular shape, wherein each segment of the plurality of segments includes a doublet, each doublet including:
two pairs of a) one inducer including an inducer inlet and an inducer outlet to turn the cooling airflow from an axial direction to a circumferential direction and b) one particle separator including a separator body, a separator inlet, and a separator outlet, wherein the separator outlet couples with the inducer inlet,
a first arm extending in a first circumferential direction, and
a second arm extending in a second circumferential direction opposite of the first arm; and
a windage cover coupled to the inducer assembly to prevent the cooling airflow from bypassing the inducer assembly.

12. The turbine engine of claim 11, wherein the inducer assembly further includes one or more web swirlers.

13. The turbine engine of claim 12, wherein the one or more web swirlers extend through the windage cover.

14. The turbine engine of claim 13, wherein the one or more web swirlers is to provide a volume of fluid from the inducer assembly bypassing the windage cover and exhausting to a high pressure turbine rotor.

15. The turbine engine of claim 11, wherein the windage cover includes a plurality of seats to couple the windage cover to the inducer assembly using a third arm.

16. The turbine engine of claim 15, further including fasteners to couple of the windage cover at the plurality of seats.

17. The turbine engine of claim 11, wherein each doublet includes a band interconnecting each inducer on each doublet.

18. The turbine engine of claim 11, wherein the windage cover is connected to the inducers of the inducer assembly.

* * * * *